United States Patent [19]

Reppert

[11] 4,256,347

[45] Mar. 17, 1981

[54] SPOKED WHEEL

[76] Inventor: Merlyn R. Reppert, 28045 Palos Verdes Dr. E., Rancho Palos Verdes, Calif. 90274

[21] Appl. No.: 86,261

[22] Filed: Oct. 18, 1979

[51] Int. Cl.³ .............................................. B60B 1/10
[52] U.S. Cl. .................................. 301/64 SH; 301/67; 29/159.03
[58] Field of Search ........... 301/64 R, 64 SH, 64 SD, 301/67; 29/159.03, 159.3

[56] References Cited

U.S. PATENT DOCUMENTS

| Re. 19,010 | 11/1933 | Smith | 301/64 SD |
| 1,850,344 | 3/1932 | Ekseraian | 301/64 SH |
| 1,994,557 | 3/1935 | Zerk | 29/159.03 |
| 2,003,109 | 5/1935 | Farr | 301/64 SD X |
| 2,041,656 | 5/1936 | Hight | 29/159.03 |
| 2,049,052 | 7/1936 | Eksergian | 301/64 SD X |
| 2,120,631 | 6/1938 | Sinclair | 29/159.03 |

Primary Examiner—Charles A. Marmor
Attorney, Agent, or Firm—Thomas A. Seeman

[57] ABSTRACT

A spoked wheel, especially for motor vehicles, with a hub and a unitary spoked-portion or spider leading from the hub to the rim of the wheel. The hub and spider-portion are independently formed from relatively thin-gauged sheet metal with the outer surface of the hub having alternating wall portions and protruding fingers which are welded respectively to the intersecting base and lower inside walls of each channel-shaped spoke to impart structural strength to the wheel. The outer end of each spoke is cornered and recessed to provide a greater surface area for welding the spoke to the wheel rim.

4 Claims, 13 Drawing Figures

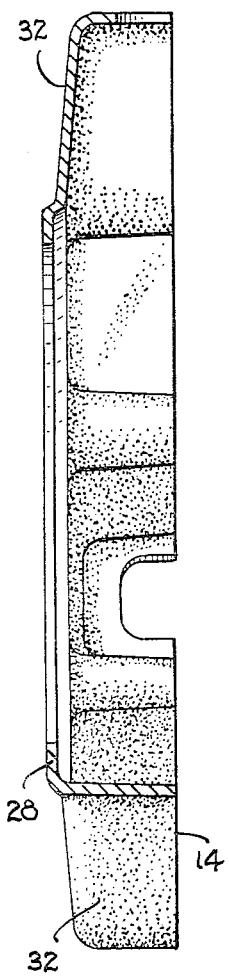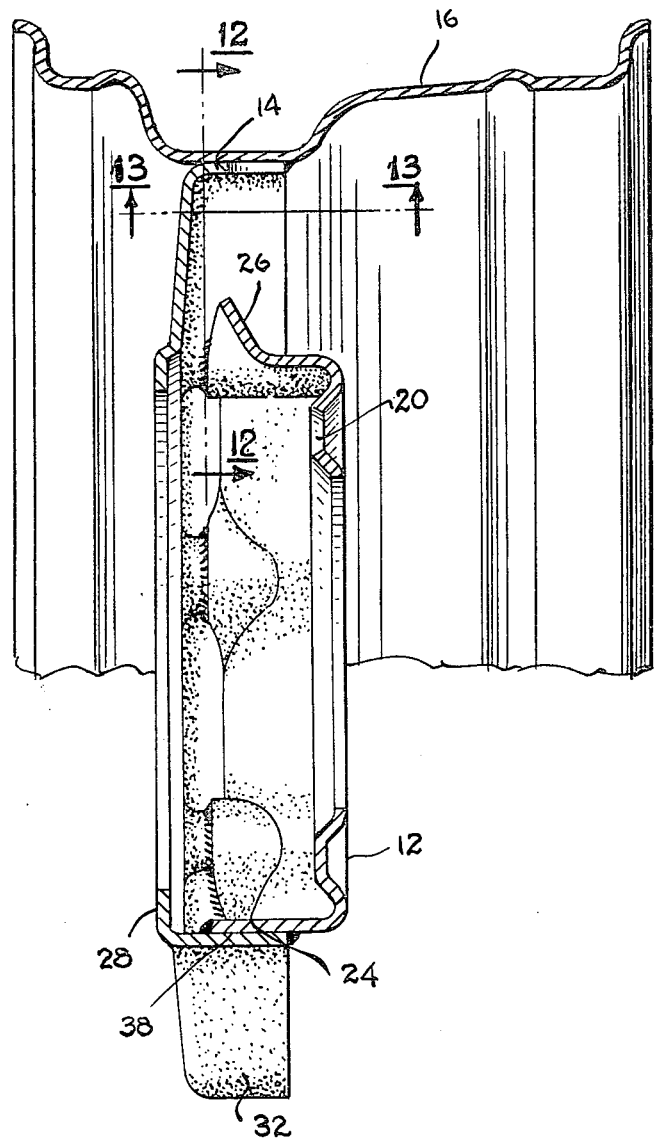
FIG. 7
FIG. 11

SPOKED WHEEL

BACKGROUND OF THE INVENTION

This invention relates to a spoked wheel especially for automotive vehicles; and more particularly to such a spoked wheel fabricated from sheet metal components that are welded together.

Wheels for motor vehicles are well known. Because of the need to conserve energy, it is desirable that modern wheels be made as light as possible. A lighter wheel enables a vehicle to have greater fuel economy as the energy needed to start the movement of the wheel is reduced. Also, with a lighter wheel, the suspension system of the vehicle may be made from lighter components which reduces the weight of the vehicle and thereby permits it to be driven more economically with a smaller engine.

One such light wheel that is currently being used and has become very popular because of its esthetic appeal is the formed-spoked wheel, as distinguished from a wire-spoked wheel. Although it is known to make such spoked wheels with the wheel center made from a casting or from sheet metal, the sheet metal construction has certain advantages. Sheet metal construction enables the wheel center to be made from less material, and therefore of lighter weight, than an equivalent cast wheel center. Also, spokes made from sheet metal may be welded directly to the rim of the wheel; whereas, if the wheel center is cast, a special steel insert must ordinarily be inserted at the end of the spoke before it can be welded, or the spoke is bolted to the rim. Further, since sheet metal is easier to chrome, it takes on a better chromed appearance than a casting. It should be understood that the term "wheel center" as used herein means that portion of the wheel interior of the rim.

The wheel centers of spoked wheels fabricated from sheet metal are preferably made in two portions: one portion being the hub and the other the spoked or spider portion, with the two portions being welded together. By this means, the hub and spiders may be interchanged with one another to accommodate hubs with different mounting configurations for various wheel vehicle mounting pads, and to accommodate different sized spiders for wheel rims of different diameters.

When designing the hub and spider portions of the wheel center, great care must be taken to assure that after the portions are assembled and welded together, the wheel will sustain the radial and lateral loads placed on the wheel when in service. Obviously, the performance of the wheel must be highly reliable when being used, owing to the dangerous consequences that would otherwise result. Also emphasis is placed on the esthetic appearance of the wheel so that the wheel may be commerically saleable. For this reason, it is important that the wheel not only be sturdy but also have the appearance of being sturdy. In addition, after the hub and spider are assembled, the exposed parts of the assembly must be accessible for polishing before being chromed to produce a fine chromed finish. Still further, the lug nuts should be covered behind a hub cap for ease of maintenance as well as appearance. Another important consideration in fabricating a wheel is cost. A small savings per wheel is substantial, considering the large volume of wheels ordinarily produced.

None of the known spoked wheel centers made from sheet metal are believed to offer an optimum wheel incorporating all the desirable characteristics of lightness in weight, rugged in construction, feasibility and economy of manufacture, ease of maintenance, and appearance.

BRIEF SUMMARY OF INVENTION

Accordingly, it is a broad object of this invention to provide a spoked wheel fabricated from sheet metal which is lightweight and exceptionally strong.

A further object of this invention is to provide a spoked wheel with an interchangeable hub and spider for compatibility with various vehicle wheel mounting pads and with wheel rims of different diameters.

Still another object of this invention is to provide a lightweight, spoked wheel fabricated from a hub and spider portions that are assembled in a manner which facilitate the welding of the assembled portions and the welding of the assembly to a wheel rim.

Another object of this invention is to provide a lightweight spoked wheel which is exceptionally feasible and economical to manufacture.

Another object of this invention is to provide a spoked wheel in which all exposed areas are accessible for polishing before the wheel is chromed.

Another object of this invention is to provide a spoked wheel which is easy to maintain.

Other objects of the invention will in part be obvious and will in part appear hereinafter.

In accordance with these objects, the invention comprises a spoked wheel center having a hub and spider fabricated from sheet metal which are assembled together and then to wheel rim in a welded construction.

The perimeter of the hub is formed with alternating wall portions and protruding fingers, and the spider is formed with a plurality of channel-shaped spokes extending radially from a cylindrical rim. The wall portions and fingers of the hub and the spokes of the spider are suitably formed relative to one another that when the hub is placed within the spider, the wall portions between the fingers on the perimeter of the hub are in contact with and underlie the base of each intersecting adjacent spoke wall of the spider, and the protruding fingers of the hub are within and adjacent to the side walls of the spokes. Thereafter, the hub is welded to the spider along these areas. In this manner, an exceptionally strong but lightweight wheel center is provided. The finger portions of the hub extending into and welded to the channel-shaped spokes reinforce the wheel against radial loads, and the overlapping welded joint at the base wall of adjacent spokes reinforce the wheel against lateral loads. Also, by the particular configuration of the hub and spider, the areas that are to be welded are easily accessible for this purpose.

After the hub is welded to the spider, the end of each spoked section is welded to the rim of the wheel. To increase the surface area for welding, each end of the spoke is cornered and recessed.

A mounting wall on the hub is provided with bolt mounting holes or other mounting means for mounting the wheel to a mounting pad of a vehicle, and the spider section may be lengthened or shortened to accommodate wheel rims of different diameters.

For ease of maintenance and appearance, the mounting wall in the hub is recessed behind the front face of the spider such that the lug nuts may be covered by a hubcap attached to the rim of the spider.

The invention, accordingly, comprises the feature of construction, and combination of elements and arrangement of parts which will be exemplified in the construction hereinafter set forth, and the scope of the invention will be indicated in the claims.

DESCRIPTION OF DRAWINGS

For a fuller understanding of the nature and objects of the invention, reference should be had to the following detailed description taken in connection with the accompanying drawings, in which:

FIG. 7 is a cross-sectional view taken along the line 7—7 in FIG. 4;

FIG. 11 is a partial cross-sectional view taken along the line 11—11 in FIG. 10.

Similar reference characters refer to similar parts throughout several views of the drawings.

DETAILED DESCRIPTION OF PREFERRED EMBODIMENT

Figure 1:
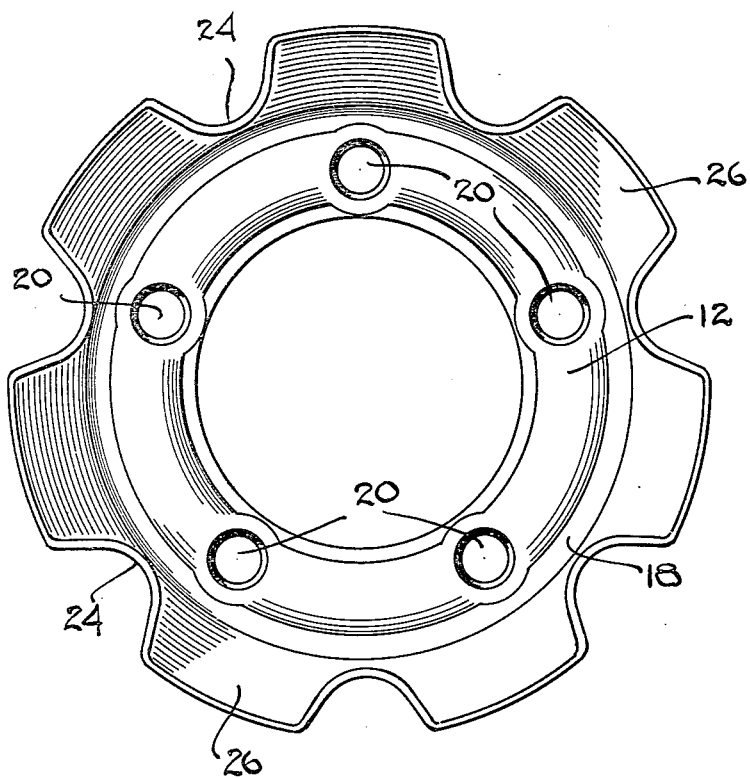
FIG. 1 is a front elevational view of the hub portion of the spoked wheel constituting this invention.

Referring now to the drawings in detail, the wheel constituting this invention, generally designated 10, comprises a hub portion 12, a spoked or spider portion 14, and a rim 16.

Figure 2:
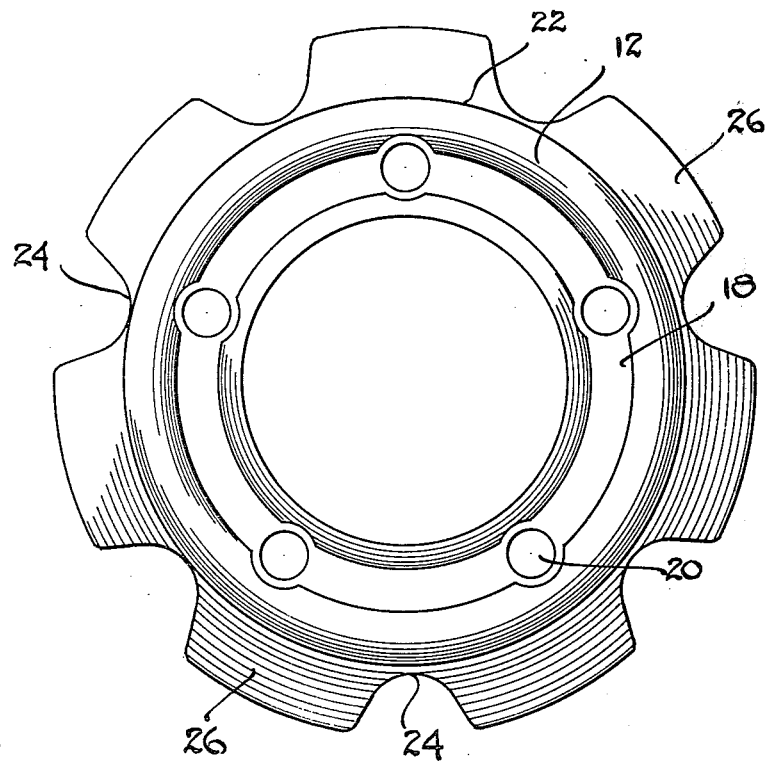
FIG. 2 is a rear elevational view of the hub of FIG. 1.
Figure 3:
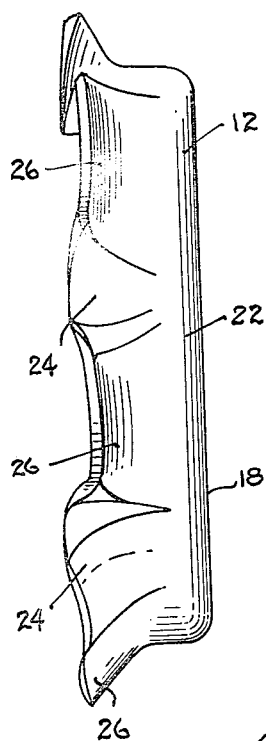
FIG. 3 is a side elevational view of the hub of FIG. 1 with the front of the hub facing upwardly.
Figure 13:
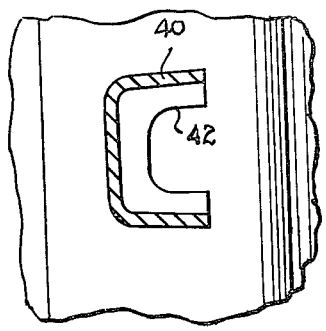
FIG. 13 is a partial cross-sectional view taken along the line 13—13 of FIG. 11, particularly showing the manner in which the end of each spoke is welded to the rim of the wheel.
Figure 4:
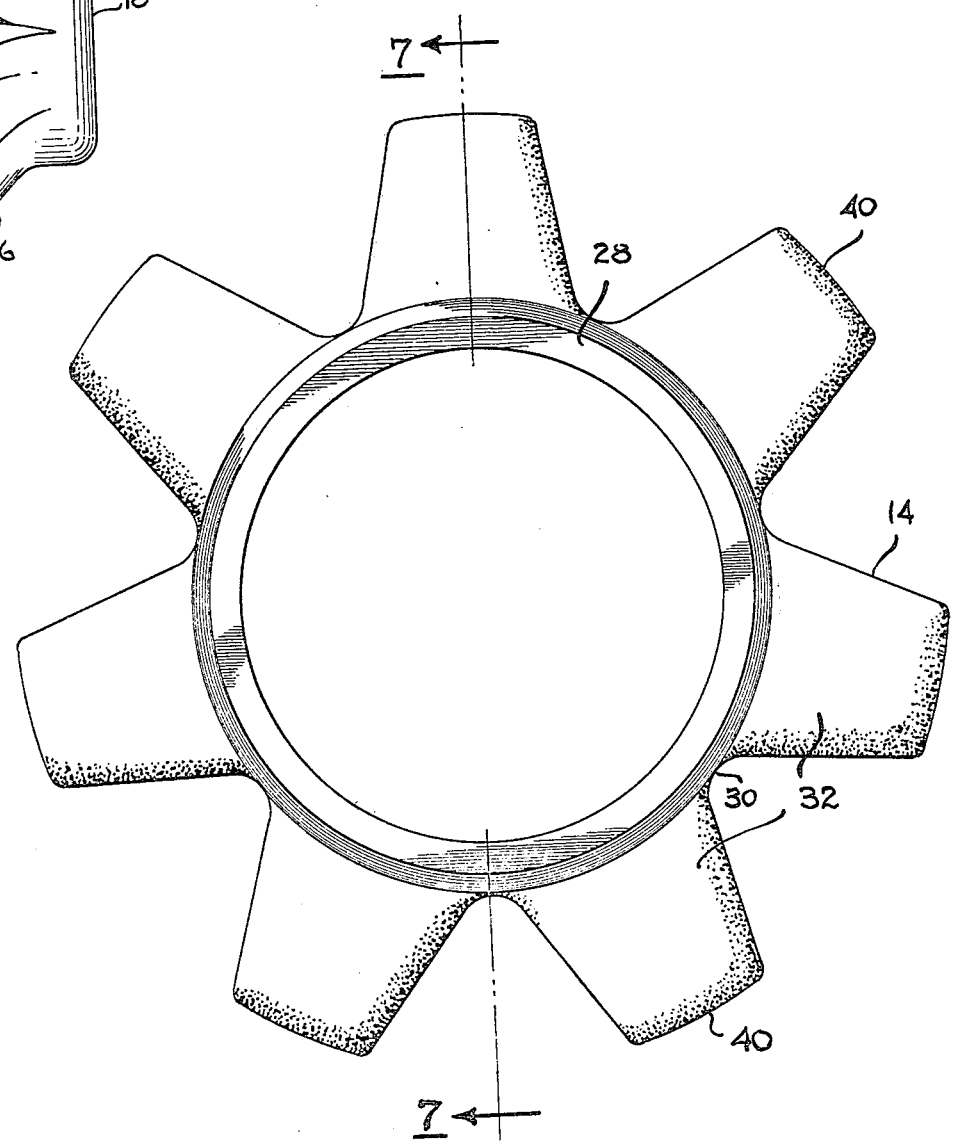
FIG. 4 is a front elevational view of the spider or spoked portion of the spoked wheel constituting this invention.
Figure 5:
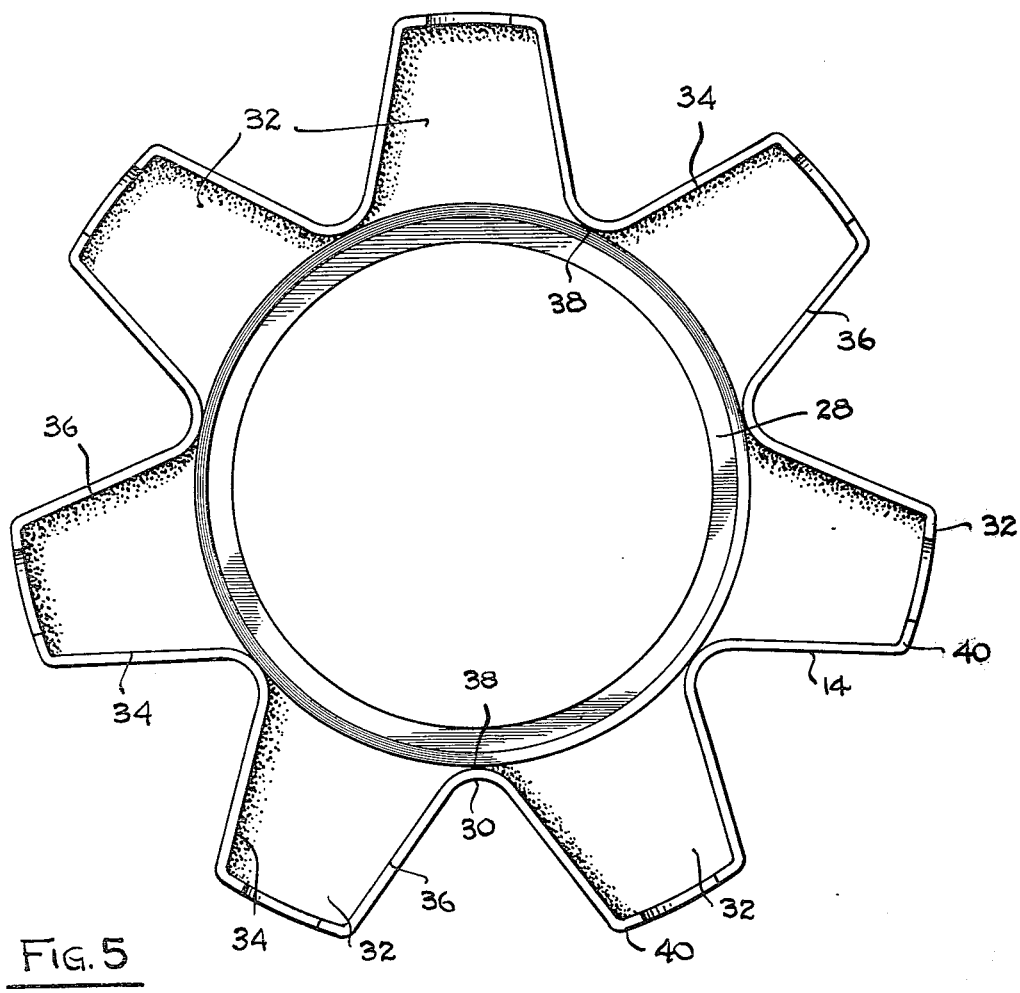
FIG. 5 is a rear elevational view of the spider shown in FIG. 4.
Figure 6:
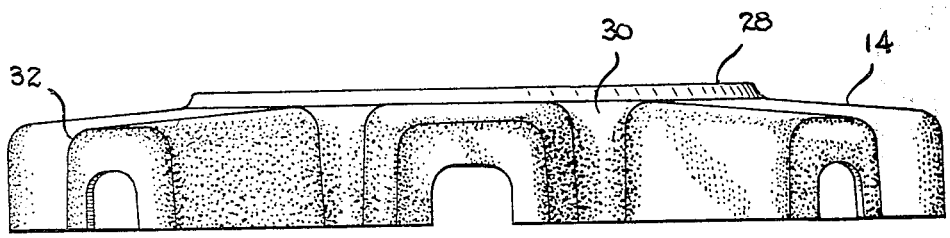
FIG. 6 is a side elevational view of the spider shown in FIG. 4.
Figure 8:
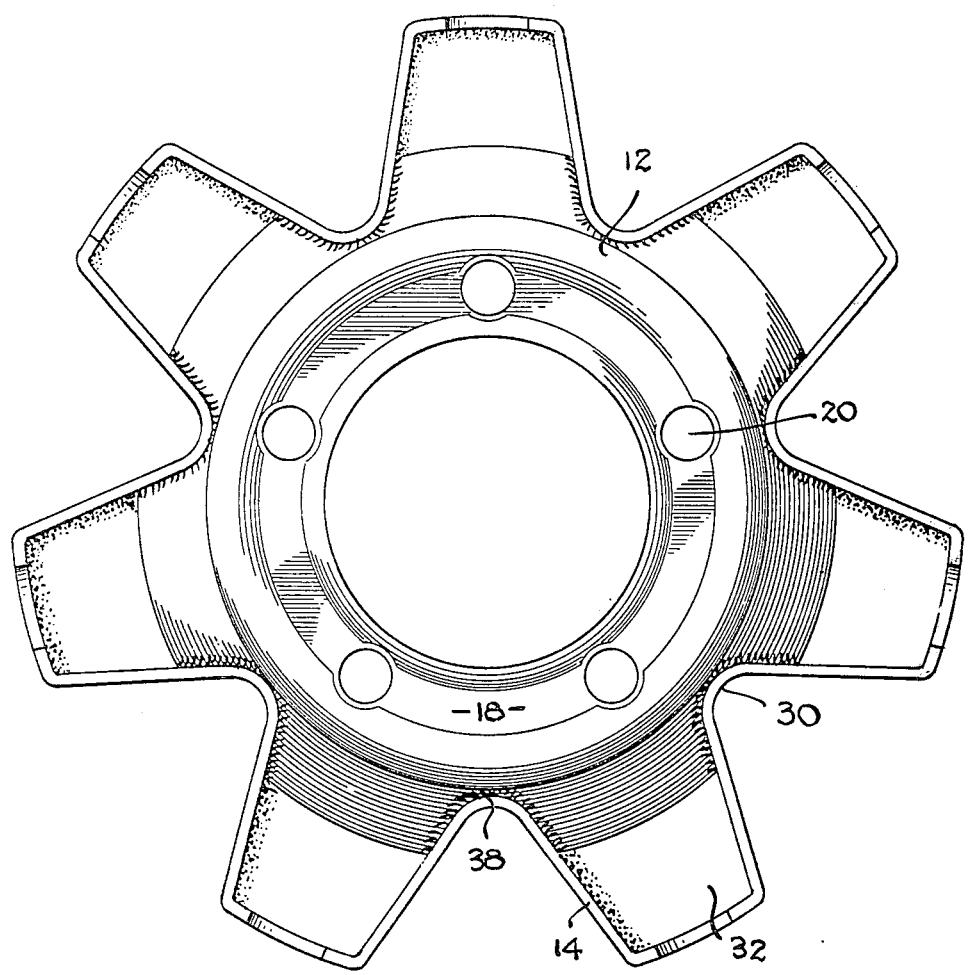
FIG. 8 is a rear elevational view of the hub and spider when assembled.
Figure 9:
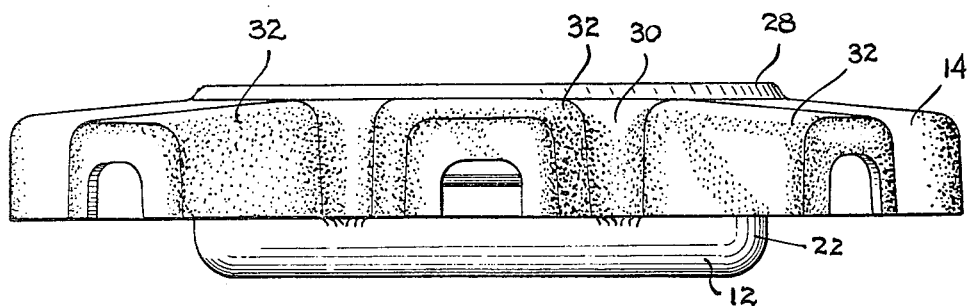
FIG. 9 is a side elevational view of FIG. 8 with the front of the wheel center facing upwardly.
Figure 10:
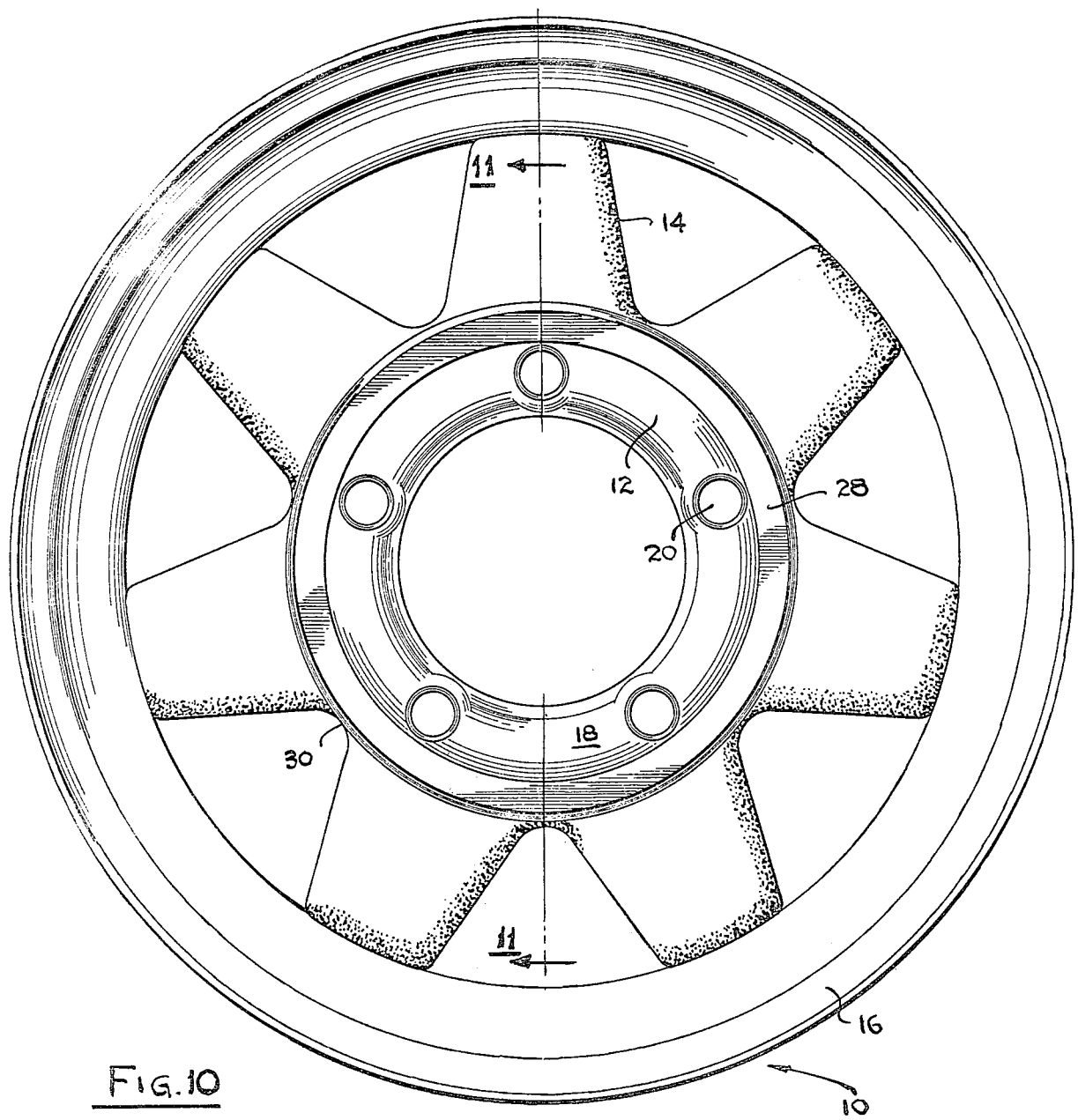
FIG. 10 is a front elevational view of the spoked wheel constituting this invention, with the hub and spider being assembled and attached to the wheel rim.

The hub 12 is best seen in FIGS. 1, 2 and 3. As shown, the hub consists of an upright mounting wall 18 having a plurality of bolt holes 20 extending therethrough for engagement with conventional mounting studs of a wheel mounting pad on a vehicle, not shown. At approximately right angles to the mounting wall, a cylindrical perimeter wall 22 of the hub extends forwardly and is formed at its free end with seven alternating and equally spaced wave-like wall portions 24 and seven protruding fingers 26. As should be obvious, the mounting wall 18 may have any number of bolt holes or mounting configurations to conform with the mounting studs or mounting means on the vehicle to which the wheel is to be attached.

The fingers 26 extend above the cylindrical plane of the perimeter wall 22 of the hub and are slightly rounded across their width to avoid an abrupt straight stress line where they intersect with the hub perimeter wall 22, which would otherwise result if the fingers were flat. The hub is formed by being stamped from a blank of sheet metal, preferably of steel plate approximately 0.150 thick, and thereafter deep drawn to a configuration shown and described. The hub, of course, can also be cast out of aluminum or similar material that can be welded together, but this is not recommended because of the resulting weight of the hub.

The spoked portion of the spider 14, is best seen in FIGS. 4 through 7. The spider 14 is also preferably stamped and thereafter deep drawn from sheet metal, preferably steel plate approximately 0.150 thick. Similar to the hub, the spider may also be cast out of aluminum or similar material but is not recommended because of the increased weight. The spider includes an upright cylindrical rim 28 and an outer base wall 30 formed approximately at right angles to the rim. Radially extending from the base wall 30 are seven unitary, equally spaced, channel-shaped spokes 32, generally having a U-shaped configuration in cross-section. Each spoke 32 has an open back with two adjoining side walls 34, 36 and is progressively reduced in width as it extends outwardly. The base or intersection of each adjoining spoke sidewall at the base wall 30 of the spider is rounded on its underside 38, as shown. The tip 40 of each spoke is cornered and is formed with generally a U-shaped recess for providing a greater surface area for welding, as will be explained later.

Figure 12:
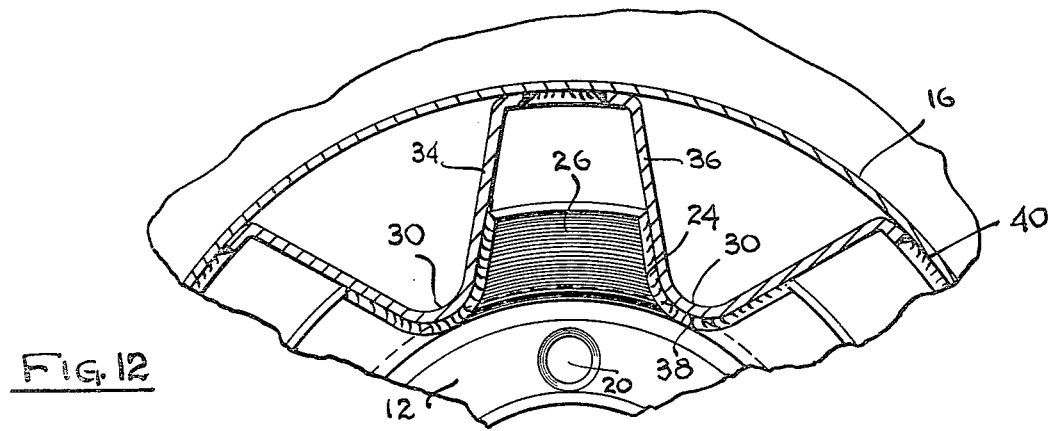
FIG. 12 is a partial cross-sectional view taken along the line 12—12 in FIG. 11, particularly showing how the manner in which the hub is welded to the spider when assembled.

The hub 12 is shown assembled to the spider 14 in FIGS. 8 through 12. The hub is assembled to the spider by the perimeter wall 22 of the hub being inserted into the interior of the spider through the rear end thereof with the fingers 26 on the hub being inserted within each respective spoke such that the sides of the fingers are adjacent to the lower sidewalls 34, 36 of the spoke, and with the wall portions 24 of the hub underlapping the underside of the base or intersection of adjacent spokes, as shown. Each finger extends generally in the longitudinal direction of the spoke. Thereafter, each finger is welded to the inside of each sidewall 34, 36 of each respective spoke, and the wall portions 24 of the hub are welded to the curved bottom 38 of the base of the adjacent spokes, as best seen in FIG. 12. It should be obvious that the hub and spider are preferred to be assembled in this manner. By this particular interlocking construction, the welding connection of the hub fingers inside of the spokes substantially increases the rigidity of the wheel and thereby imparts greater strength and resistance against radial loads. At the same time, the overlapping welded connection of the wall portions of the hub with the bottom of the wall imparts greater strength and resistance against lateral loads imposed on the wheel.

After the hub 12 is assembled to the spider 14, the assembled wheel center is prepared for being chromed by being polished with a high speed polishing mechanism, as is well understood by those skilled in the art. Inasmuch as all areas of the wheel which will be exposed when the wheel is placed on a vehicle are accessible for being polished, the construction of the wheel lends itself to having a fine chromed finish.

It should be understood that the length of the spokes 32 may be increased or reduced to accommodate wheel rims of different diameters. Also, although seven spokes are preferred, the spider may be formed with more or less spokes, with the hub being modified accordingly with a corresponding number of fingers.

The rim 28 of the spider is provided both for structural rigidity of the wheel and also to accommodate a hubcap, not shown, which may be snapped upon the rim to cover the inside of the hub.

The mounting wall 18 of the hub 12 is also recessed with respect to the rim 28 of the spider 14 such that when the wheel is mounted on a vehicle, the lug nuts will be behind the hubcap. This allows the wheel to be easily cleaned and maintained since there are no visible lug nuts to collect dust and debris and also gives a better appearance to the wheel.

After the hub is welded to the spider, to correct any distortion caused by the heat of welding, the wheel is centered and the outer tips 40 of the spokes are machined to true the tips to the center of the wheel. Thereafter, the tip of each spoke is welded to the wheel rim 16, which may easily be accomplished since the spoke is opened at the rear. By the tip 40 of each spoke being cornered and recessed, a relatively large welding surface is created along the inside edge 42 of the tip to weld a bead to the rim. The rim itself is of conventional construction, and may take any desired shape or form without departing from the scope of this invention.

Now that the invention has been described, it should be obvious that the invention provides certain advantages. First, as the wheel center is fabricated from relatively thin-gauged sheet metal, the wheel is extremely light weight. Yet, by the manner of the interlocking welded connection between the hub and the spider, an exceptionally strong wheel is provided which will resist and withstand the radial and lateral loads placed on the wheel in service. In addition, by the manner of construction, the components of the wheel are easily accessible for being welded together. Still further, hubs of different mounting configurations may be combined with the same spider for mounting the wheel to different wheel mounting pads; or conversely, spiders of different sizes may be mounted on the same hub for wheel rims of different diameters. In this way, the total number of components for the necessary spectrum of various wheels may be substantially reduced. Still further, the wheel center is clean and rugged in design and accessible for being polished for chrome plating. Finally, the wheel is exceptionally easy and economical to manufacture.

While I have typically described a certain embodiment of my invention, it is of course to be understood that the invention is not limited to that particular embodiment or form, but rather is applicable broadly to numerous variations falling within the scope of the appended claims.

I claim:

1. A wheel center comprising:
   (a) an annular hub having an upright wall with wheel-mounting means thereon for mounting the wheel to a vehicle and with an annular wall on the front face of the hub extending generally at a right angle to the upright wall, said annular wall having a substantially annular base portion with finger portions protruding upwardly and outwardly therefrom at spaced intervals;
   (b) a spider having a plurality of spoke sections extending radially outwardly at spaced intervals from an annular base wall portion, each of said spoke sections being three-sided with a front face and two rearwardly extending side walls in a channel-like configuration; and
   (c) the hub being assembled to the spider with the front face of the hub facing the rear of the spider, with each of said finger portions extending upwardly toward and welded within a respective spoke section of the spider, and with the top face of the annular base portion of the hub in juxtaposition with and welded to the underside of the base wall portion of the spider whereby the finger portions of the hub are interlocked to the spoked sections of the spider with the base portion of the hub underlying and locked to the base wall portion of the spider.

2. The wheel center of claim 1 in combination with the wheel rim forming a wheel therewith and the tip of each spoke section connected to the inside of the wheel rim.

3. The wheel of claim 2 wherein the spider includes a cylindrical upright rim substantially perpendicular to the base wall portion of the spider to which a hub cap may be attached, said finger portions of the hub are rounded adjacent said base portion of the hub, and the end of each spoke section is cornered and recessed to facilitate welding the spoke section to the wheel rim.

4. The wheel of claim 2 wherein the spider carries seven channel-shaped spokes with each of said spokes converging in width as it extends outwardly and said channel-shaped spokes being generally U-shaped in cross-section.

* * * * *